Reissued Nov. 12, 1935 Re. 19,749

UNITED STATES PATENT OFFICE 19,749

METHOD OF EXTRACTING ROSIN FROM RESINOUS WOOD

Leavitt N. Bent, Holly Oak, Del., assignor to Hercules Powder Company, Wilmington, Del., a corporation of Delaware No Drawing. Original No. 1,888,025, dated November 15, 1932, Serial No. 254,622, February 15, 1928. Application for reissue September 8, 1934, Serial No. 743,185

15 Claims. (Cl. 87—2)

My invention relates to a method for extracting rosin from wood.

As is well known, a principal source of rosin is in stumps and down wood of the long leaf pine harvested from cut over lands and subjected in a comminuted state to treatment for the removal of turpentine and pine oil and then to extraction with gasoline, which acts to dissolve out rosin.

In accordance with prior practice the stumps and down wood are comminuted to a suitable size and loaded into retorts or extractors in which the turpentine and part of the pine oil are removed by the use of live steam. The wood is then subjected to extraction with a solvent, as a low boiling petroleum hydrocarbon, which acts to dissolve out the remaining pine oil and the rosin. The solvent is finally separated from the spent wood by steaming and rosin and pine oil are recovered from the solvent by frictional distillation. Such a process is, for example, more fully described in the U. S. Patent to Yaryan No. 915,400.

Heretofore in the extraction of rosin from wood, it has been deemed essential to utilize a solvent which is immiscible with water, as, for example, a light hydrocarbon solvent, since water resulting from the presence of moisture in the wood, from condensation of the steam used for extraction of the turpentine and from the final steaming of the wood to effect separation of the solvent from the spent wood must be continually rejected from the system. Heretofore, petroleum-naphtha, or gasoline, has been considered the most satisfactory solvent, but such is found to be open to a number of objections chief among which are that it is capable of extracting in the cold only about 75% of the resinous material present in the wood, and that when heated it constitutes a fire risk and requires a particulalr type of apparatus for its use.

Now, in accordance with my invention, I effect the extraction of the resinous material from wood by the use of a cold, water miscible solvent, and more particularly, such a solvent mixed with a certain amount of water, the concentration of the solvent being such that it will dissolve out all of the resinous matters from the wood and at the same time of a concentration such that when further diluted, as by moisture in the wood, it may be recovered in substantially its original concentration by distillation from a simple still.

As solvents, the use of which I contemplate in accordance with my invention, may be mentioned, for example, acetone, alcohol, methanol and the like, and the treatment of the wood with one or another of the water miscible solvents in accordance with my invention may be in accordance with the usual practice at atmospheric or increased pressure and with the use of any ordinary or desirable form of apparatus. The solvent when used will, as has been indicated, be mixed with water to a concentration enabling its recovery at substantially its original concentration by distillation from a simple still and depending upon the particular solvent selected may be mixed with water to a concentration of solvent within, for example, about the range 65%–90%. More specifically, acetone may be desirably used at a concentration of about 75%, alcohol at about 80% and methanol at about 80%.

As a specific example of the carrying out of the method in accordance with my invention wood chips, which normally contain about 15%–18% of moisture, are steamed in the usual manner for distillation off of turpentine, and after steaming will contain about 20%–25% of moisture. The wood chips after steaming are extracted with, for example, acetone mixed with water to a concentration of about 75%. The acetone during the process of extraction and solvent recovery will pick up sufficient moisture from the wood chips to reduce its concentration from 75% to about 70% and may be completely recovered as 80% acetone by running it through a simple still in which the solvent will be separated from the rosin extracted.

As a further example of the carrying out of the method in accordance with my invention, 100 pounds of pine wood, suitably chipped, is extracted with say 232 pounds of a solution of acetone in water of a concentration of say, for example, 86% acetone. During the extraction heat may be applied, through it will be understood that the application of heat is not necessary. The extraction may be carried out at atmospheric pressure. After a suitable period the acetone solution, together with extracted rosin, is drained from the wood and the wood may be re-extracted with say 235 pounds of 86% acetone solution, which in turn is drained from the wood and, if desired, third, fourth and even fifth extractions may be effected. Extraction with 86% acetone solution, using say five extractions, will be found to remove from 99% to 100% of the acetone soluble rosin, or about 23 pounds in the foregoing example.

As an alternative method there may be added to the dilute acetone solution of rosin sufficient butane, pentane, or other water immiscible low boiling petroleum hydrocarbon, which is not miscible with the solvent, as acetone, used for extracting the wood, and which has a greater solvent power on the rosin than has the solvent used for extraction of the wood in a closed vessel to prevent the volatilizing of the butane, to extract from this dilute acetone solution of rosin the rosin content. Butane and dilute acetone being substantially immiscible, two layers will be formed on settlement, the upper layer being a butane solution of rosin, the lower being a dilute acetone solution containing dark colored resinous bodies. The lower layer is drawn off and distilled to rid it of the excess water picked up from the wood chips, and for the recovery of dark colored rosin and other extracted materials which are soluble in acetone but not soluble in butane. The upper layer is distilled to recover the butane for re-use and separate it from the rosin. The acetone recovered from the wood chips by steaming will be found to be of about 55% concentration and may be recovered completely as a 68% acetone by running it through a simple still in which rosin will be separated out. The two recovered solvents are after recovery added together and will produce an acetone of 74% concentration or approximately of the same concentration as the original acetone and available for re-use in extraction.

As will be obvious the water miscible solvent, such as alcohol, acetone, etc., is not a good solvent for turpentine but is a good solvent for pine oil as well as for rosin. Consequently where a resinous wood containing turpentine and pine oil, i. e., wood from which turpentine has not been removed, for example, by steaming, is extracted, the turpentine will largely remain and will be separated from the wood by steaming, for example, in connection with recovery of solvent from the wood, and may be readily refined by distillation. Pine oil contained by the wood will be largely dissolved out with the rosin and will be readily separated from the rosin and solvents by distillation.

The method according to my invention, and more especially the use of a water miscible solvent, will enable the extraction of substantially all the resinous matter from wood chips and while the rosin recovered will be found to be darker than that obtained by prior methods, it may be readily purified to a common or superior grade of rosin by distillation, by treatment with selective solvents, by treatment with decolorizing earths or charcoal or by other known methods. Further, due to the high percentage extraction of rosin, the spent wood chips will be found more suitable for use, for example, in the manufacture of paper pulp, and the like, than heretofore.

It will be understood that the figures given in the above example may vary considerably in practice for various reasons, such as the moisture content of the wood chips treated, the quality of steam used, the size of the extractor, etc., and it will be appreciated that generally speaking efficiency will be promoted by a high ratio of solvent to wood and a maximum concentration of solvent within limits enabling recovery of the solvent as described.

It will be understood that in carrying out the process according to my invention, I contemplate not only use of a simple still for the recovery of the solvent, but also the use of continuous evaporators or other form of apparatus.

What I claim and desire to protect by Letters Patent is:

1. The method of extracting rosin from resinous wood, which includes extracting the wood with an organic aliphatic solvent for the rosin which is miscible with water, adding a low boiling petroleum hydrocarbon, which has selective solvent power on the rosin and which is immiscible and non-reactive with the first mentioned solvent, to the solution of rosin obtained, separating the low boiling petroleum hydrocarbon and dissolved rosin from the original solvent and distilling off the low boiling hydrocarbon for the recovery of rosin.

2. The method of extracting rosin from resinous wood, which includes extracting the wood with an alcohol solvent for the rosin, adding a low boiling petroleum hydrocarbon, which has a selective solvent power on the rosin, to the solution of rosin obtained, separating the low boiling petroleum hydrocarbon and dissolved rosin from the alcohol and distilling off the low boiling hydrocarbon for the recovery of rosin.

3. The method of extracting rosin from resinous wood, which includes extracting the wood with a monohydric alcohol a solvent for the rosin, adding a low boiling petroleum hydrocarbon, which has a selective solvent power on the rosin, to the solution of rosin obtained, separating the low boiling petroleum hydrocarbon and dissolved rosin from the monohydric alcohol and distilling off the low boiling hydrocarbon for the recovery of rosin.

4. The method of extracting rosin from resinous wood, which includes extracting the wood with methyl alcohol a solvent for the rosin, adding a low boiling petroleum hydrocarbon, which has a selective solvent power on the rosin, to the solution of rosin obtained, separating the low boiling petroleum hydrocarbon and dissolved rosin from the monohydric alcohol and distilling off the low boiling hydrocarbon for the recovery of rosin.

5. The method of extracting rosin from pine wood which includes extracting the wood with a water miscible organic aliphatic solvent diluted with water to a concentration within the range 65%–90%, extracting rosin from the solution obtained with a low boiling petroleum hydrocarbon which is immiscible and non-reactive with the solvent, separating the low boiling petroleum hydrocarbon and extracted rosin from the original solvent and distilling off the low boiling hydrocarbon for the recovery of rosin.

6. The method of extracting rosin from pine wood which includes extracting the wood with a water miscible organic aliphatic solvent diluted with water to a concentration within the range 65%–90%, extracting rosin from the solution obtained with a low boiling petroleum hydrocarbon which is immiscible and non-reactive with the solvent, separating the low boiling petroleum hydrocarbon and extracted rosin from the original solvent, distilling off the low boiling hydrocarbon for the recovery of rosin and distilling the original solvent.

7. The method of extracting rosin from pine wood which includes extracting the wood with an alcohol diluted with water, extracting rosin from the solution obtained with a low boiling petroleum hydrocarbon which is immiscible with the diluted alcohol, separating the low boiling petroleum hydrocarbon and extracted rosin from the original solvent and distilling off the low boiling hydrocarbon for the recovery of rosin.

8. The method of extracting rosin from pine wood which includes extracting the wood with methyl alcohol diluted with water, extracting rosin from the solution obtained with a low boiling petroleum hydrocarbon which is immiscible with the diluted methyl alcohol, separating the low boiling petroleum hydrocarbon and extracted rosin from the original solvent and distilling off the low boiling hydrocarbon for the recovery of the rosin.

9. The method of extracting rosin from pine wood which includes extracting the wood with an alcohol diluted with water to a concentration of about 80% extracting rosin from the solution obtained with a low boiling petroleum hydrocarbon which is immiscible with the diluted alcohol separating the low boiling petroleum hydrocarbon and extracted rosin from the original solvent and distilling off the low boiling hydrocarbon for the recovery of rosin.

10. The method of extracting rosin from pine wood which includes extracting the wood with an organic solvent for the rosin which is miscible with water, adding a low boiling petroleum hydrocarbon, which has greater solvent power on the rosin and which is immiscible with the solvent used, to the solution of rosin obtained, separating the low boiling petroleum hydrocarbon and dissolved rosin from the original solvent and distilling off the low boiling hydrocarbon for the recovery of rosin.

11. The method of extracting rosin from pine wood which includes extracting the wood with a water miscible organic aliphatic solvent for the rosin diluted with water, extracting rosin from the solution obtained with a low boiling petroleum hydrocarbon which is immiscible and non-reactive with the solvent used and separating the low boiling petroleum hydrocarbon and extracted rosin from the original solvent and distilling off the low boiling hydrocarbon for the recovery of rosin.

12. The method of extracting rosin from pine wood which includes extracting the wood with acetone diluted with water, extracting rosin from the solution obtained with a low boiling petroleum hydrocarbon which is immiscible with acetone, separating the low boiling petroleum hydrocarbon and extracted rosin from the original solvent and distilling off the low boiling hydrocarbon for the recovery of rosin.

13. The method of extracting rosin from pine wood which includes extracting the wood with acetone diluted with water, extracting rosin from the solution obtained with butane, separating the butane and extracted rosin from the acetone and distilling off the butane for the recovery of the rosin.

14. The method of extracting rosin from resinous wood, which includes extracting the wood with an organic aliphatic solvent for the rosin which is miscible with water, adding a low boiling petroleum hydrocarbon, which has selective solvent power on the rosin and which is immiscible and non-reactive with the first mentioned solvent, to the solution of rosin obtained, separating the low boiling petroleum hydrocarbon and dissolved rosin from the original solvent, distilling off the low boiling hydrocarbon for the recovery of rosin and heating the wood to a temperature such as to remove organic water-miscible solvent therefrom.

15. The method of extracting rosin from resinous wood, which includes extracting the wood with an organic aliphatic solvent for the rosin which is miscible with water, adding a low boiling petroleum hydrocarbon, which has selective solvent power on the rosin and which is immiscible and non-reactive with the first mentioned solvent, to the solution of rosin obtained, separating the low boiling petroleum hydrocarbon and dissolved rosin from the original solvent, distilling off the low boiling hydrocarbon for the recovery of rosin and steaming the wood for the removal of organic water-miscible solvent therefrom.

LEAVITT N. BENT.